United States Patent
Baek

(10) Patent No.: US 10,637,184 B2
(45) Date of Patent: Apr. 28, 2020

(54) ONE-TOUCH TERMINAL FOR ELECTRIC CONNECTION OF ELECTRIC CABLE TO INDUSTRIAL ELECTRICAL EQUIPMENT INCLUDING LIGHTNING ARRESTOR

(71) Applicant: NDElectric Co., Ltd., Gimpo-si, Gyeonggi-do (KR)

(72) Inventor: Min Su Baek, Seoul (KR)

(73) Assignee: NDELECTRIC CO., LTD., Gimpo-si, Gyeonggi-Do (KR)

( * ) Notice: Subject to any disclaimer, the term of this patent is extended or adjusted under 35 U.S.C. 154(b) by 0 days.

(21) Appl. No.: 16/206,195

(22) Filed: Nov. 30, 2018

(65) Prior Publication Data

US 2019/0173226 A1 Jun. 6, 2019

(51) Int. Cl.
| | |
|---|---|
| H01R 13/58 | (2006.01) |
| H01R 13/621 | (2006.01) |
| H01T 4/08 | (2006.01) |
| H02G 13/00 | (2006.01) |
| H01R 4/01 | (2006.01) |
| H02G 15/06 | (2006.01) |

(52) U.S. Cl.
CPC .............. *H01R 13/621* (2013.01); *H01R 4/01* (2013.01); *H01T 4/08* (2013.01); *H02G 13/80* (2013.01); *H02G 15/06* (2013.01)

(58) Field of Classification Search
CPC ...... H01R 13/53; H01R 33/945; H01R 13/59; H01R 4/5025; H01C 7/12; H01C 7/126; H01L 23/552; H01T 4/20; H01H 33/6661; H01B 17/42

USPC ......... 439/181–187, 462, 784, 805; 361/117, 361/118, 127, 128, 131, 132, 135
See application file for complete search history.

(56) References Cited

U.S. PATENT DOCUMENTS

| | | | | |
|---|---|---|---|---|
| 1,527,400 A | * | 2/1925 | Frankel | .................. H01R 11/15 |
| | | | | 439/805 |
| 2,463,144 A | * | 3/1949 | Buchanan | .............. H01R 4/308 |
| | | | | 439/805 |

(Continued)

FOREIGN PATENT DOCUMENTS

| | | |
|---|---|---|
| KR | 20-0298822 Y1 | 12/2002 |
| KR | 20-0305508 Y1 | 3/2003 |
| KR | 10-1828372 B1 | 2/2018 |

*Primary Examiner* — Thanh Tam T Le
(74) *Attorney, Agent, or Firm* — Novick, Kim & Lee, PLLC; Jae Youn Kim

(57) ABSTRACT

Provided is a one-touch terminal for electric connection of an electric cable to industrial electrical equipment including a lightning arrester. The one-touch terminal includes a metal fitting cap and a biter capable of fastening and electrically connecting any of various electric cables (5 m PDC, etc.) including a lead wire to an upper-electrode-integrated-type coupling socket or to a coupling portion of an upper-electrode-separated-type metal fitting body of a lightning arrester in a one-touch manner. The metal fitting cap, in which a wedge-type biter having an elastic-pressing-type biting/releasing structure is mounted, is detachably mounted to a metal fitting body (or a coupling socket), thereby rapidly and precisely performing electric connection (fastening) of an electric cable (5 m PDC, etc.) to any of various connection metal fittings (a bushing terminal, a terminal clamp, a bus-bar-type terminal board, etc.).

6 Claims, 14 Drawing Sheets

(56) References Cited

U.S. PATENT DOCUMENTS

| | | | | |
|---|---|---|---|---|
| 4,199,213 | A * | 4/1980 | Tachick | H01H 33/045 |
| | | | | 439/185 |
| 4,293,178 | A * | 10/1981 | Lee | H01R 13/585 |
| | | | | 174/659 |
| 4,627,762 | A * | 12/1986 | Scotti | F16G 11/048 |
| | | | | 24/136 R |
| 4,989,115 | A * | 1/1991 | Bourdages | H01C 7/12 |
| | | | | 338/21 |
| 5,113,306 | A * | 5/1992 | Veverka | H01C 7/12 |
| | | | | 361/117 |
| 5,159,748 | A * | 11/1992 | Doone | H01C 7/12 |
| | | | | 156/286 |
| 6,626,610 | B1 * | 9/2003 | Seegmiller | E21D 21/008 |
| | | | | 173/176 |
| 8,059,379 | B2 * | 11/2011 | Saito | H01C 7/126 |
| | | | | 361/117 |
| 8,077,442 | B2 * | 12/2011 | Saito | H01C 7/12 |
| | | | | 361/127 |
| 8,760,835 | B2 * | 6/2014 | Ozaki | H01C 7/12 |
| | | | | 361/117 |
| 8,982,526 | B2 * | 3/2015 | Anjiki | H01C 7/12 |
| | | | | 361/126 |

\* cited by examiner

UPPER-ELECTRODE-INTEGRATED TYPE (COVER-INTEGRATED TYPE)

UPPER-ELECTRODE-INTEGRATED TYPE
(COVER-SEPARATED TYPE)

UPPER-ELECTRODE-SEPARATED TYPE (COVER-SEPARATED TYPE)

VERTICAL-TYPE ONE-TOUCH METAL FITTING

HORIZONTAL-TYPE ONE-TOUCH METAL FITTING

INSERT L-SHAPED BENT MEMBER INTO HORIZONTAL-TYPE
ONE-TOUCH METAL FITTING TO FASTEN ELECTRIC CABLE IN PERPENDICULAR DIRECTION

SHAPE OF LOCK-RELEASE BUSHING

FORMABLE IN VARIOUS SHAPES SUCH AS CIRCULAR SHAPE, ELLIPTICAL SHAPE, ETC.

ONE-TOUCH TERMINAL FOR ELECTRIC CONNECTION OF ELECTRIC CABLE TO INDUSTRIAL ELECTRICAL EQUIPMENT INCLUDING LIGHTNING ARRESTOR

BACKGROUND OF THE INVENTION

Field of the Invention

The present invention relates to a one-touch terminal for electric connection of an electric cable to industrial electrical equipment including a lightning arrester, which includes a metal fitting cap and a biter capable of fastening and electrically connecting any of various electric cables (5 m PDC, etc.) including a lead wire to an upper-electrode-integrated-type coupling socket or to a coupling portion of an upper-electrode-separated-type metal fitting body of a lightning arrester in a one-touch manner, and more particularly to a one-touch terminal for electric connection of an electric cable to industrial electrical equipment including a lightning arrester, in which a metal fitting cap, in which a wedge-type biter having an elastic-pressing-type biting/releasing structure is mounted, is detachably mounted to a metal fitting body (or a coupling socket), thereby rapidly and precisely performing electric connection (fastening) of an electric cable (5 m PDC, etc.) to any of various connection metal fittings (a bushing terminal, a terminal clamp, a bus-bar-type terminal board, etc.).

The present invention enables connection of an electric cable, from which the sheath has been stripped, merely through an insertion (pushing) operation, and also enables removal of the electric cable merely through a re-pushing operation, thereby enabling even an unskilled worker to rapidly and conveniently work without specialized tools and consequently greatly improving convenience of use, working efficiency and productivity.

In addition, the present invention has excellent binding capability to securely fix an electric cable, thereby effectively withstanding strong wind or external shocks and consequently greatly reducing the risk of accidents such as fires attributable to disconnection or cutting of the electric cable.

Description of the Related Art

In general, a connection terminal is used to connect an electric cable (5 m PDC, etc.) to a connection metal fitting (a bushing terminal, a terminal clamp, a bus-bar-type terminal board, etc.) of any one of a lightning arrester, a cutout switch, an insulator (a primary high-pressure bushing, a secondary low-pressure bushing, etc.) for a pole transformer and industrial electrical equipment. This connection terminal is configured to simultaneously perform an electric conduction function and a connection-fixing function with respect to a corresponding connection metal fitting.

As a typical example of use of such a conventional connection terminal, an electric cable is placed between a pair of clamps, which are coupled to an electric terminal board of target electrical equipment or a specific product using bolts and nuts, and electric conduction is accomplished by fixing the clamps and the electric cable through engagement of the bolts and the nuts.

However, when connecting the electric cable and the connection terminal to each other, it may be difficult to work while unrolling the electric cable. Further, because tools (spanners, screwdrivers, etc.) for bolting work are required, assembly, fastening and coupling work may be quite inconvenient. Furthermore, it may be difficult to ensure workers' safety due to working in high places. Pedestrians' safety may also be threatened by dropping of tools.

In addition, in the related art, poor and dangerous working conditions may cause defective mounting of the connection terminal, resulting in unstable connection and severe deterioration in electric conductivity. On the other hand, when the electric cable is fastened with excessive force, the electric cable may be damaged.

RELATED ART DOCUMENT

[Patent Document]
(Patent Document 0001) 1. Korean Registered Utility Model No. 20-0305508 (registered on Feb. 13, 2003)
(Patent Document 0002) 2. Korean Registered Utility Model No. 20-0298822 (registered on Dec. 9, 2002)

SUMMARY OF THE INVENTION

Therefore, the present invention has been made in view of the above problems, and it is an object of the present invention to provide a one-touch terminal for electric connection of an electric cable to industrial electrical equipment including a lightning arrester, which includes a metal fitting cap and a biter capable of fastening and electrically connecting any of various electric cables (5 m PDC, etc.) including a lead wire to an upper-electrode-integrated-type coupling socket or to a coupling portion of an upper-electrode-separated-type metal fitting body of a lightning arrester in a one-touch manner, and more particularly, in which a metal fitting cap, in which a wedge-type biter having an elastic-pressing-type biting/releasing structure is mounted, is detachably mounted to a metal fitting body (or a coupling socket), thereby rapidly and precisely performing electric connection (fastening) of an electric cable (5 m PDC, etc.) to any of various connection metal fittings (a bushing terminal, a terminal clamp, a bus-bar-type terminal board, etc.).

It is another object of the present invention to provide a one-touch terminal for electric connection of an electric cable to industrial electrical equipment including a lightning arrester, which has excellent binding capability to securely fix an electric cable, thereby effectively withstanding strong wind or external shocks and consequently greatly reducing the risk of accidents such as fires attributable to disconnection or cutting of the electric cable.

In accordance with the present invention, the above and other objects can be accomplished by the provision of a one-touch terminal for electric connection of an electric cable to industrial electrical equipment including a lightning arrester, the one-touch terminal including: a metal fitting cap including an assembly portion formed at one side thereof so as to be detachably coupled to an upper-electrode-integrated-type coupling socket or to a coupling portion of an upper-electrode-separated-type metal fitting body of a lightning arrester, and an opening hole formed therein so as to communicate with an accommodation recess, the opening hole having an inclined surface formed such that the diameter thereof gradually decreases toward an inlet port of the metal fitting cap, through which an electric cable is introduced; and a biter including a joint holder formed so as to be accommodated in the accommodation recess and the opening hole, the joint holder being formed to have a wedge-type hollow pipe configuration, being split into bodies in the axial direction, and being provided at one side thereof with a support protrusion, around which a coil-type elastic spring is disposed, the support protrusion and the elastic spring being accommodated in the accommodation recess, and provided at the opposite side thereof with a holding portion having a tightening surface, wherein, when the joint holder is inserted into the opening hole, a portion of the outer end of the holding portion is exposed outside the opening hole.

The metal fitting body may be provided at one side thereof with a fastening portion formed so as to be assembled and coupled to a connection metal fitting of any one of a lightning arrester, a cutout switch, an insulator for a pole transformer and industrial electrical equipment, and is provided at a side thereof opposite the fastening portion with a coupling portion having therein the accommodation recess in order to accommodate a portion of the electric cable, from which the sheath has been stripped, therein. The fastening portion of the metal fitting body may be any one of a vertical-type one-touch terminal and a horizontal-type one-touch terminal. The connection metal fitting may be any one of a bushing terminal, a terminal clamp and a bus-bar-type terminal board. The insulator may be any one of a primary high-pressure bushing and a secondary low-pressure bushing.

The holding portion of the joint holder may be formed in a conic shape so as to correspond to the inclined surface of the opening hole, and the joint holder may be further provided with a largest-diameter portion formed at one end of the support protrusion so as to be larger than an introduction end of the opening hole.

The tightening surface of the joint holder may be provided with an uneven portion formed with a constant pitch in order to increase a force of holding the outer circumferential surface of the electric cable.

The coupling portion of the metal fitting body and the assembly portion of the metal fitting cap may be formed so as to be engaged with or disengaged from each other in a thread-engagement manner.

The one-touch terminal may further include a lock-release bushing provided on the outer end of the holding portion of the joint holder. The lock-release bushing may include a push plate formed at one side thereof, a withdrawal portion formed at the opposite side thereof, and a through-hole formed through the push plate and the withdrawal portion. When a copper wire of the electric cable, from which the sheath has been stripped, is inserted into the through-hole, the copper wire may be guided and introduced into the space defined by the tightening surface. A portion of the withdrawal portion that is in contact with the holding portion may have an outer diameter smaller than the diameter of the opening hole so that the withdrawal portion moves into and out of the opening hole as the elastic spring is compressed and expanded.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
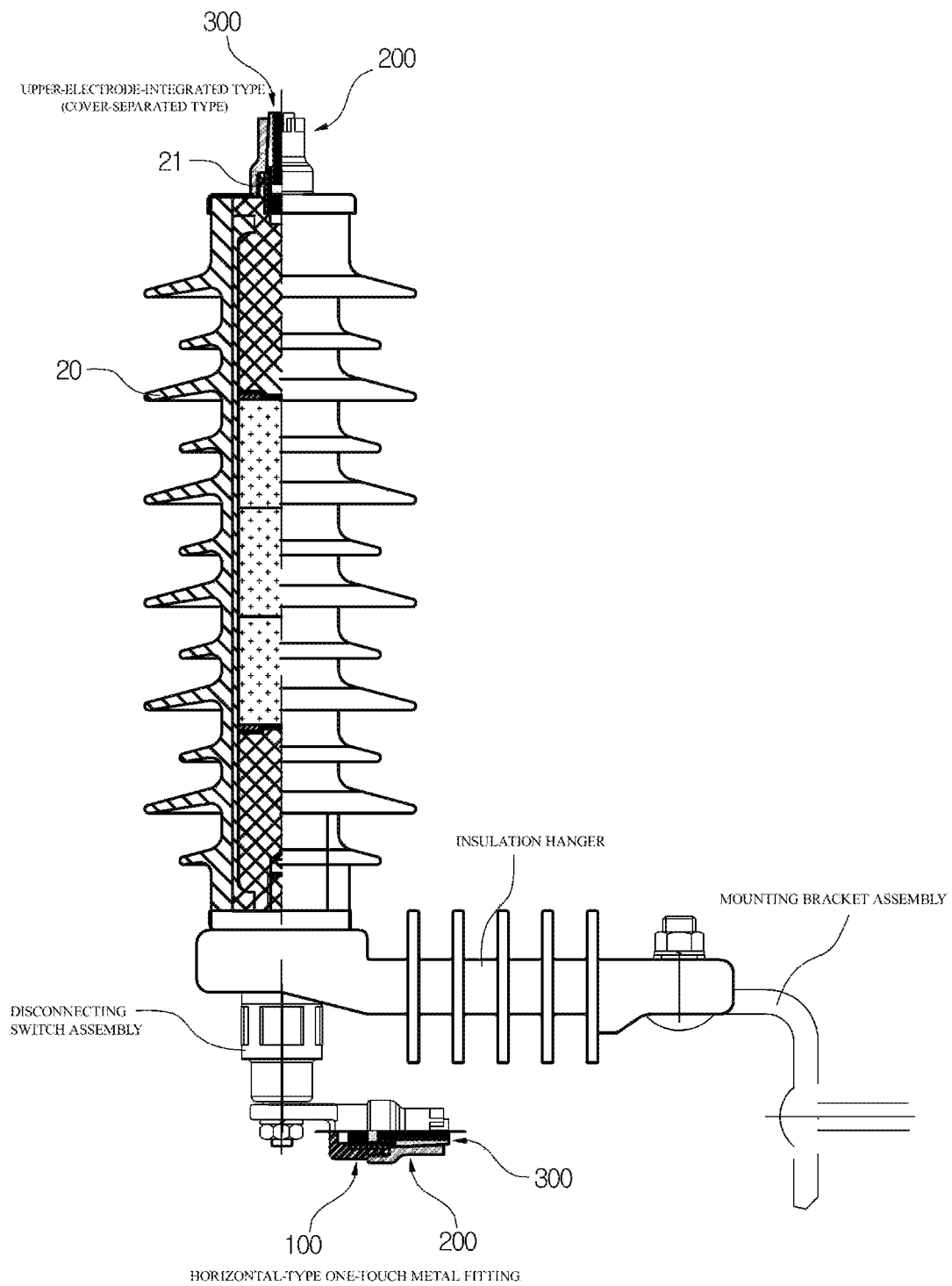
FIG. 1 is a view illustrating an example in which a one-touch terminal according to the present invention is applied to a general lightning arrester.
Figure 2:
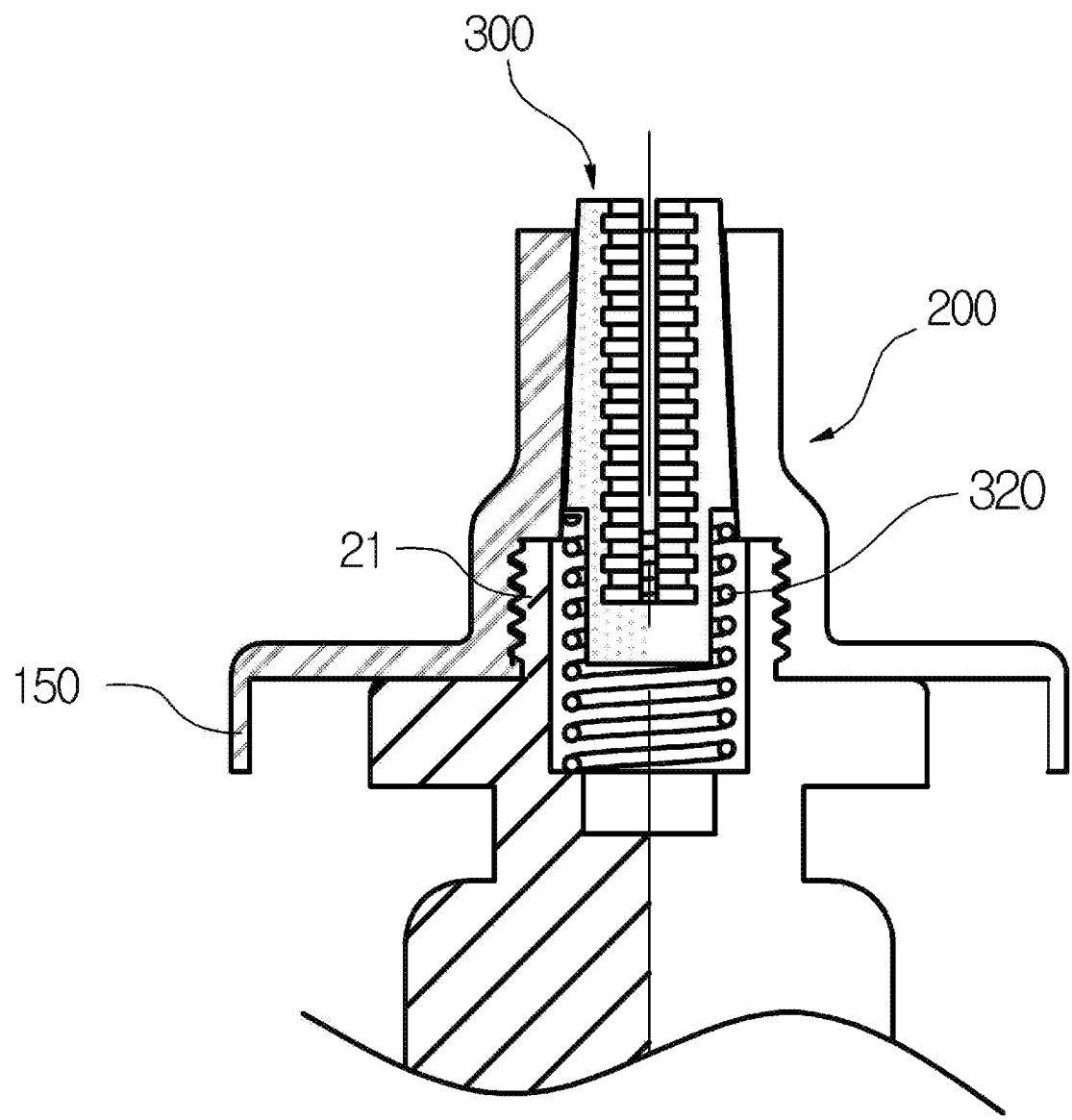
FIG. 2 is a view illustrating an example in which the one-touch terminal according to the present invention is formed to have an upper-electrode-integrated and cover-integrated-type structure when applied to a lightning arrester.
Figure 3:
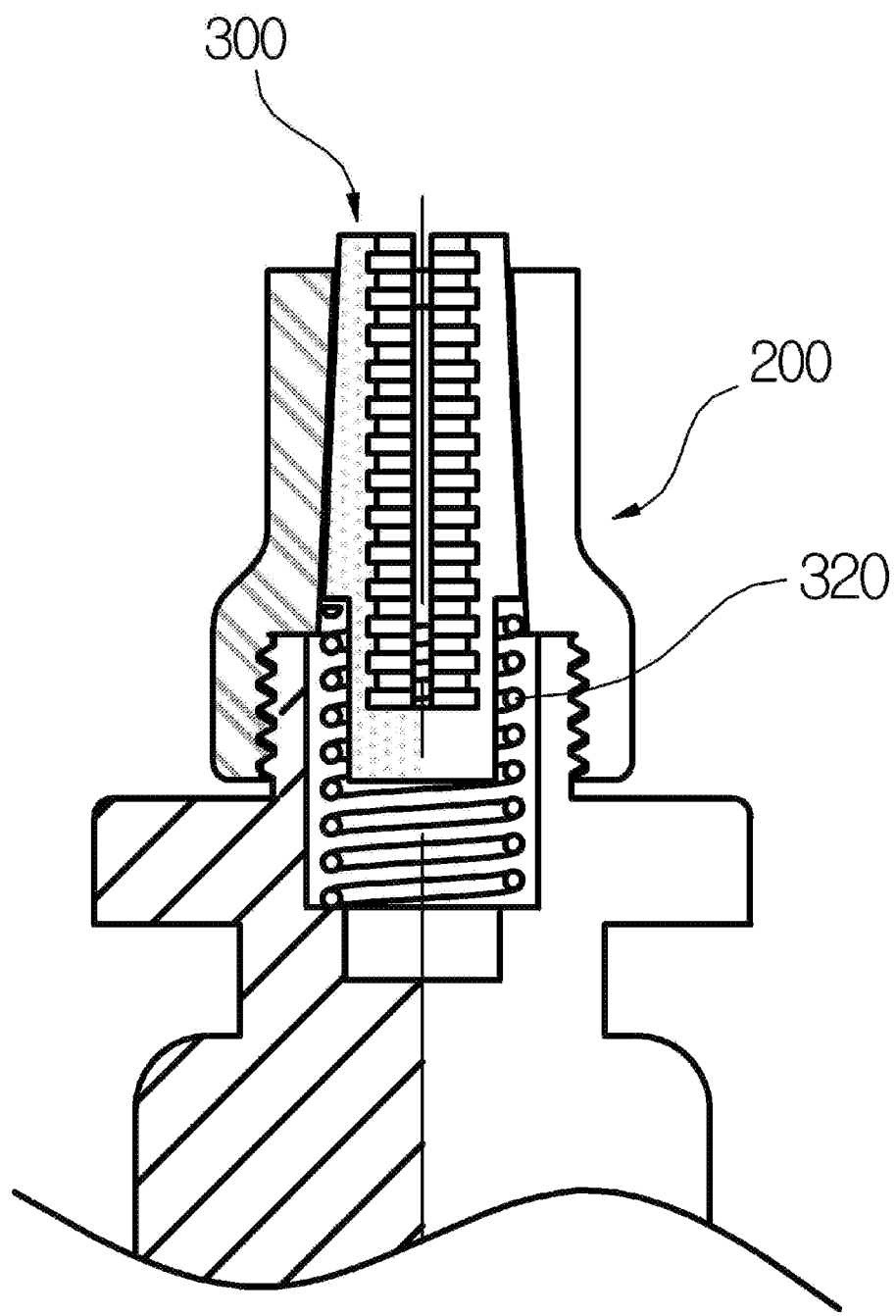
FIG. 3 is a view illustrating an example in which the one-touch terminal according to the present invention is formed to have an upper-electrode-integrated and cover-separated type structure when applied to a lightning arrester.
Figure 4:
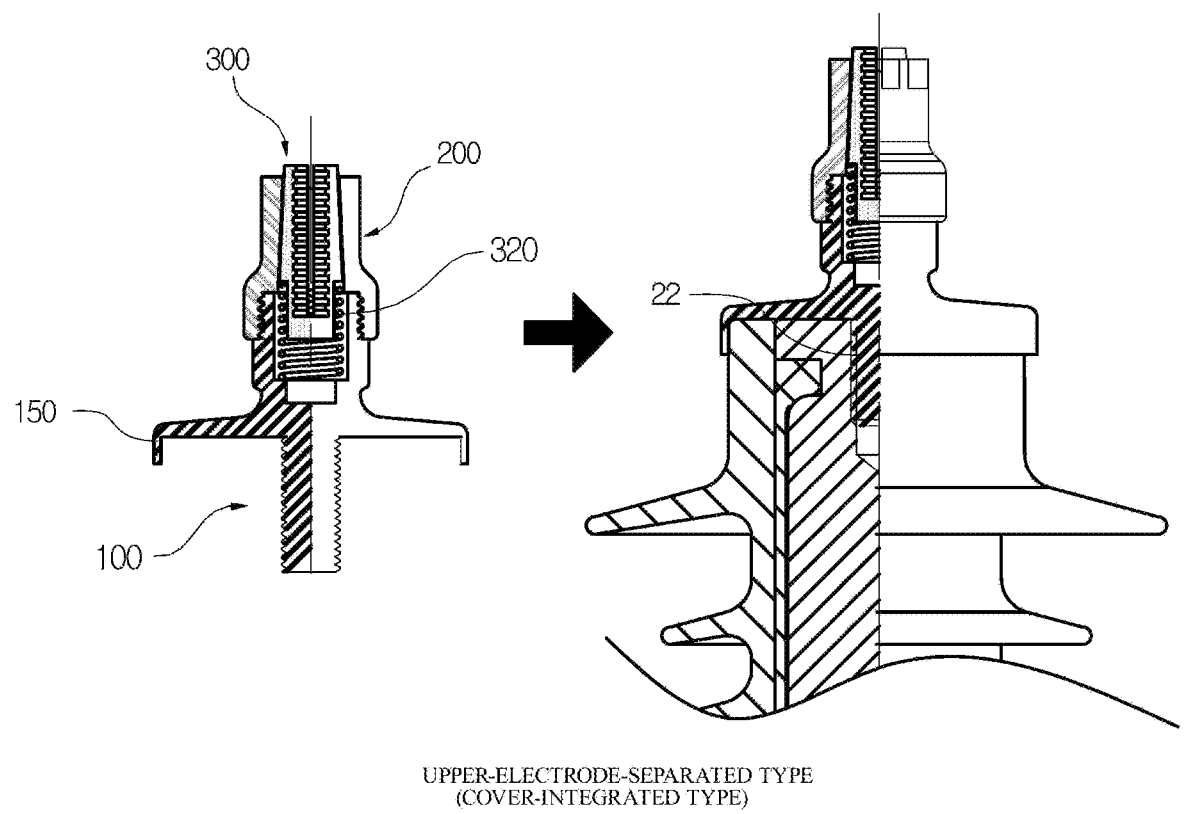
FIG. 4 is a view illustrating an example in which the one-touch terminal according to the present invention is formed to have an upper-electrode-separated and cover-integrated type structure when applied to a lightning arrester.
Figure 5:
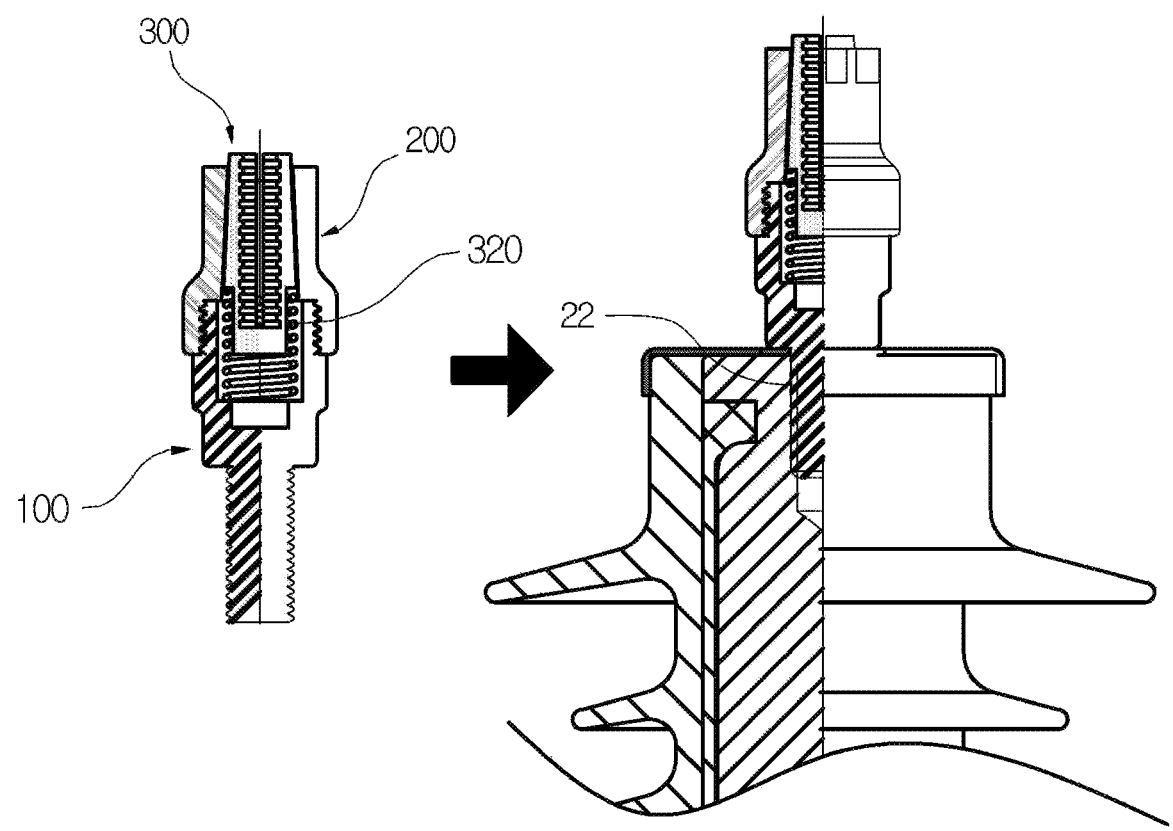
FIG. 5 is a view illustrating an example in which the one-touch terminal according to the present invention is formed to have an upper-electrode-separated and cover-separated type structure when applied to a lightning arrester.
Figure 6:
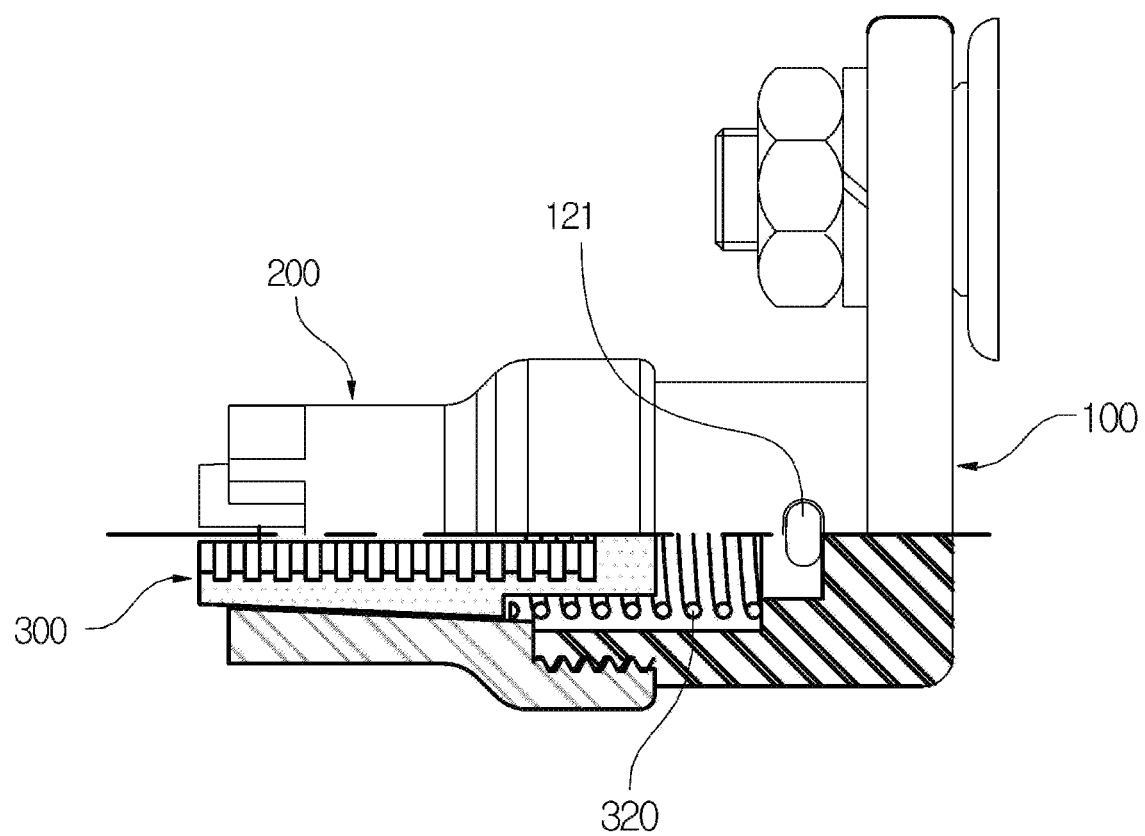
FIG. 6 is a view illustrating an example in which the one-touch terminal according to the present invention is implemented as a vertical-type one-touch terminal.
Figure 7:
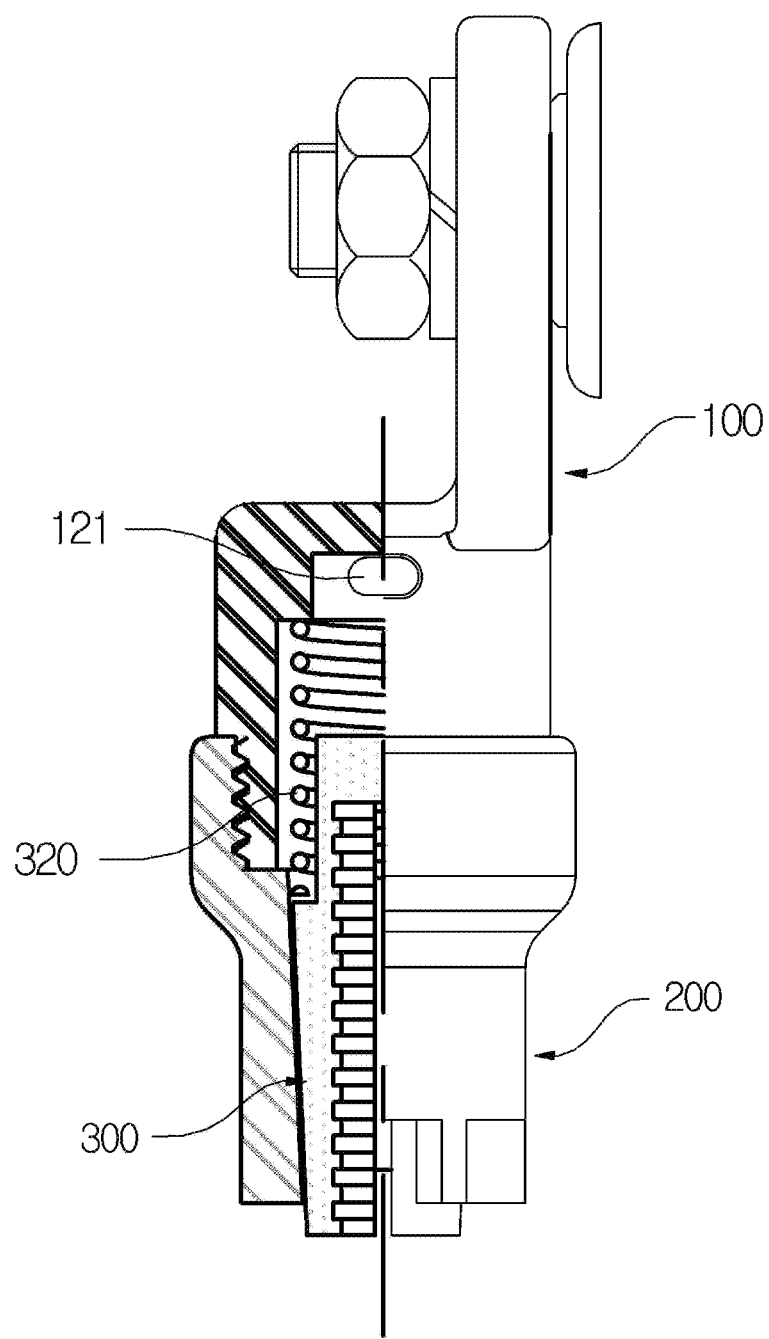
FIG. 7 is a view illustrating an example in which the one-touch terminal according to the present invention is implemented as a horizontal-type one-touch terminal.
Figure 8:
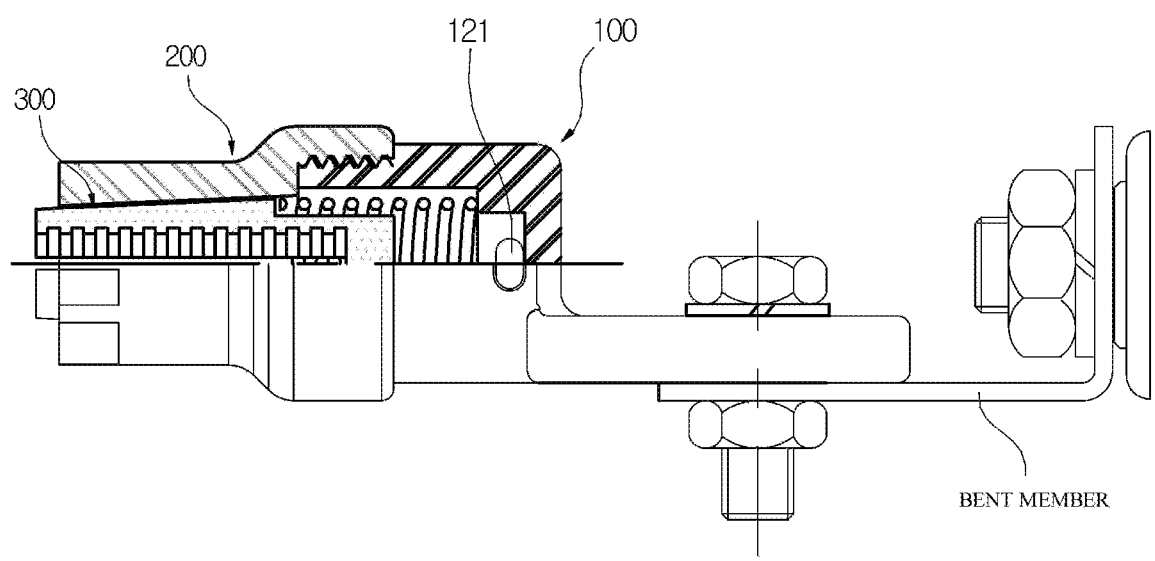
FIG. 8 is a view illustrating an example of the one-touch terminal according to the present invention in which an L-shaped bent member is inserted into a horizontal-type one-touch metal fitting so as to fasten an electric cable in a perpendicular direction.
Figure 9:
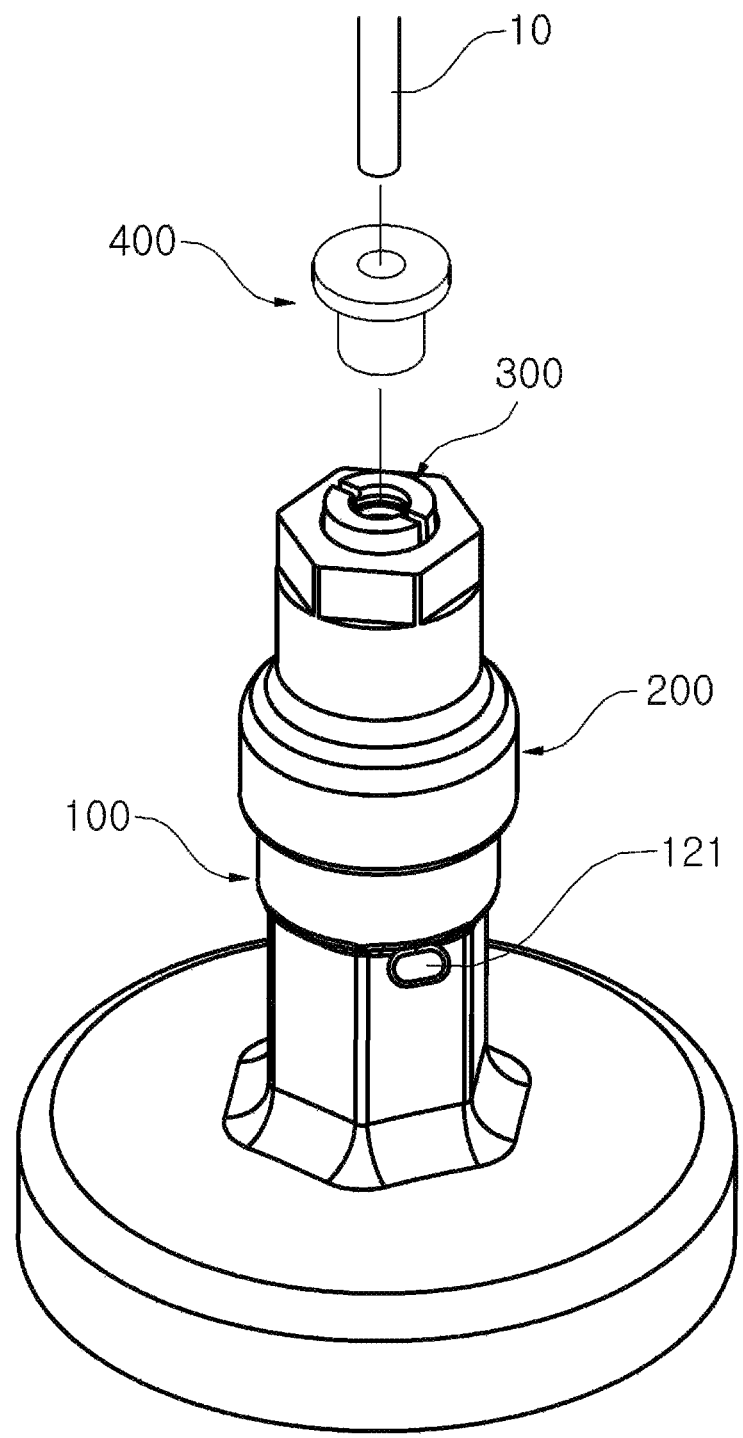
FIG. 9 is an exploded perspective view illustrating an example of the one-touch terminal according to the present invention.
Figure 10:
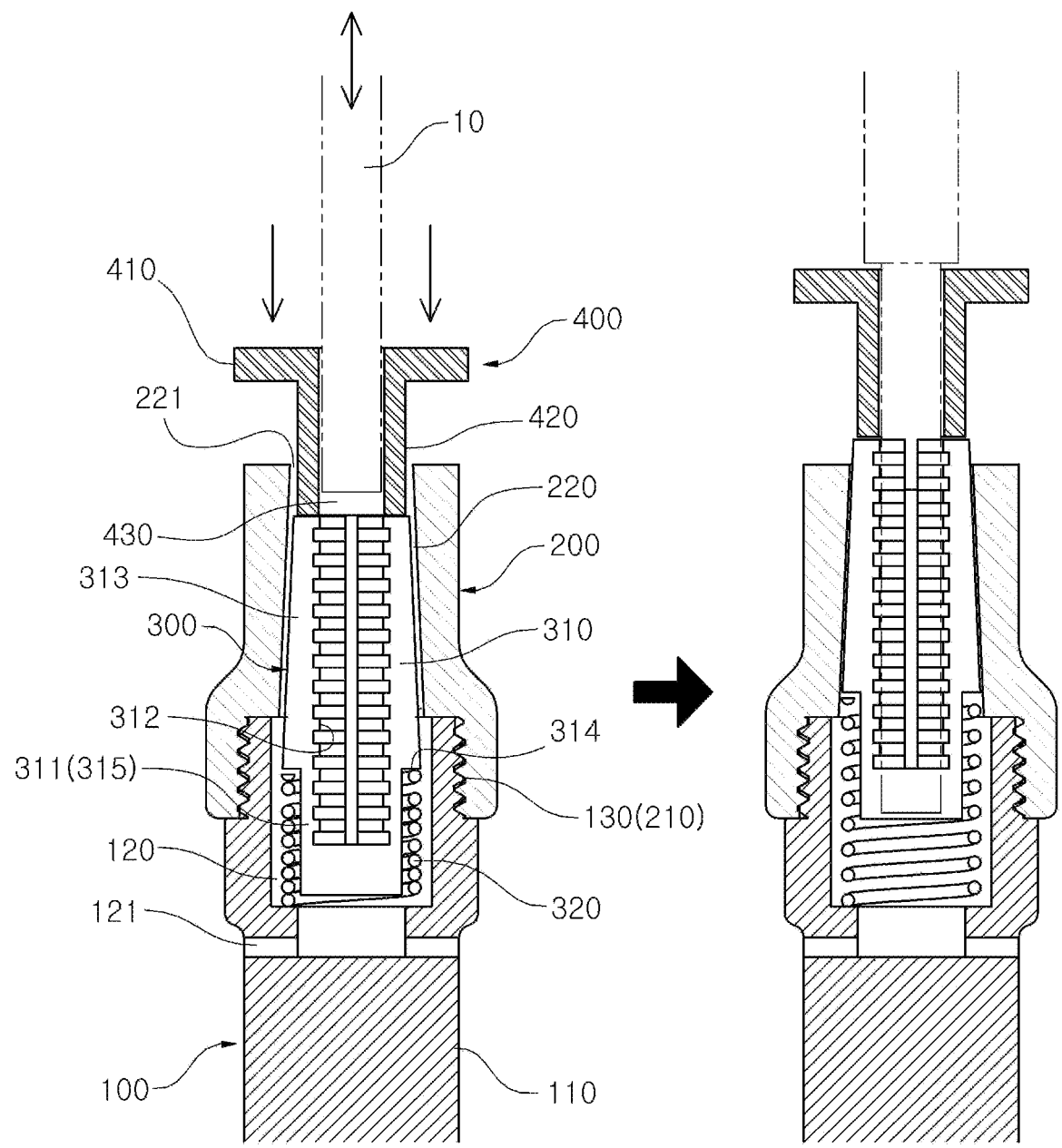
FIG. 10 is a side sectional view illustrating the operation of the one-touch terminal shown in FIG. 2.

Hereinafter, exemplary embodiments of the present invention will be described in detail with reference to the accompanying drawings.

As illustrated in FIGS. 1 to 14, the present invention broadly includes an upper-electrode-integrated-type coupling socket 21 or an upper-electrode-separated-type metal fitting body 100 of a lightning arrester 20, a metal fitting cap 200, and a biter 300.

That is, embodiments of the present invention are applicable to various types of parts when applied to a lightning arrester. For example, an upper-electrode-integrated-type structure of a lightning arrester is configured such that a coupling socket is provided at the upper end of an upper electrode so that a metal fitting cap to be described below is detachably mounted thereto. The detailed configuration of the coupling socket may be formed so as to be the same as the basic configuration (an accommodation recess, a coupling portion, a drain hole for water discharge, etc., excluding a fastening portion) of a metal fitting body, which will be described later.

The metal fitting body 100 has an upper-electrode-separated-type structure and is formed of a metal or synthetic resin material. The metal fitting body 100 is provided at one side thereof with a fastening portion 110 (a vertical-type one-touch terminal or a horizontal-type one-touch terminal), which is formed so as to be assembled and coupled to a connection metal fitting (a bushing terminal, a terminal clamp, a bus-bar-type terminal board, etc.) of any one of a lightning arrester, a cutout switch, an insulator (a primary high-pressure bushing, a secondary low-pressure bushing, etc.) for a pole transformer and industrial electrical equipment.

The fastening portion may be any one selected from a bolt configuration diverging outwards, a thread groove configuration formed inwards, a configuration in which a coupling hole is formed in a horizontal-type one-touch terminal flange and a configuration in which a coupling hole is formed in a vertical-type one-touch terminal flange. The fastening portion may also be configured so as to be applicable to various coupling types, including an integrated type and a separable assembly type.

For example, the above-mentioned fastening portion may be configured to allow an L-shaped bent member to be inserted into any one of an upper-electrode-integrated and cover-integrated-type connection structure, an upper-electrode-integrated and cover-separated type connection structure, an upper-electrode-separated and cover-integrated type connection structure, an upper-electrode-separated and cover-separated type connection structure, a vertical-type one-touch terminal direct connection structure, a horizontal-type one-touch terminal direct connection structure and a horizontal-type one-touch metal fitting in order to fasten an electric cable so as to be perpendicular thereto.

At this time, the cover 150 is selectively coupled to a metal fitting cap or a metal fitting body so as to be coupled to the upper electrode of a lightning arrester in an integrated manner or in a separable manner.

The metal fitting body 100 includes a coupling portion 130 having therein an accommodation recess 120. The coupling portion 130 is formed at a position opposite the fastening portion 110. A portion of the electric cable 10, from which the sheath has been stripped, is accommodated in the accommodation recess 120 in the coupling portion 130.

The metal fitting body 100 may further include a drain hole for water discharge 121, which extends from the outer circumferential surface of the accommodation recess 120 in the outward direction so that the interior of the accommodation recess 120 communicates with the outside in order to discharge rainwater introduced into the accommodation recess 120 to the outside.

That is, the drain hole is a through-hole that penetrates the metal fitting body 100 so that the interior of the accommodation recess 120 communicates with the outside. The drain hole may be provided in a plural number in order to rapidly discharge rainwater introduced through the coupling portion to the outside.

The metal fitting cap 200 may be formed of a metal or synthetic resin material. The metal fitting cap 200 includes an assembly portion 210 formed at one side thereof so as to be detachably coupled to the coupling portion 130 of the metal fitting body. The metal fitting cap 200 further includes an opening hole 220 formed therein so as to communicate with the accommodation recess 120. The opening hole 220 has an inclined surface formed such that the diameter thereof gradually decreases toward an inlet port of the metal fitting cap 200, through which the electric cable 10 is introduced.

A support protrusion of a joint holder of the biter, which will be described later, is accommodated in the accommodation recess. An elastic spring, which is disposed around the support protrusion, is also accommodated in the accommodation recess.

The elastic spring is configured to be compressed and expanded in the longitudinal direction (axial direction) of the joint holder so as to bias the joint holder in the outward direction at normal times. When the electric cable is introduced, the elastic spring is compressed toward the partition wall of the accommodation recess, and the split bodies of the joint holder are expanded such that the inner diameter thereof increases.

Since the elastic spring biases the joint holder in the outward direction at normal times, the split bodies of the joint holder tighten the outer circumferential surface of the electric cable while the inner diameter thereof decreases.

With this configuration, the electric cable is easily inserted merely by pushing the outer end of the joint holder of the biter, and is also easily removed merely by re-pushing the outer end of the joint holder of the biter.

The biter 300 is formed such that the joint holder 310 is accommodated in the accommodation recess 120 and the opening hole 220. The joint holder 310 is formed to have a wedge-type hollow pipe configuration, and is split into bodies in the axial direction.

The joint holder is provided at one side thereof with the support protrusion 311, around which the coil-type elastic spring 320 is disposed. The support protrusion 311 and the elastic spring 320 disposed therearound are accommodated in the accommodation recess 120. The joint holder is provided at the opposite side thereof with a holding portion 313 having a tightening surface 312. When the joint holder is inserted into the opening hole 220, a portion of the outer end of the holding portion 313 is exposed outside the opening hole 220.

As described above, the joint holder is of a small tubular type that is split into at least two bodies and has both open ends. The tightening surface 312 is formed on the inner circumferential surface of the joint holder. The tightening surface of each of the two split bodies has a semi-circular shape in cross section so as to correspond to the electric cable. Therefore, when the two split bodies of the joint holder are joined symmetrically to each other, the joint holder forms a cylindrical-shaped hollow region.

In other words, the joint holder, which is split into two bodies, is accommodated in the accommodation recess in the metal fitting body and the opening hole in the metal fitting cap, the support protrusion, around which the elastic spring is disposed, is accommodated in the accommodation recess, and a portion of the holding portion 313 is exposed outside from an introduction end 221 of the opening hole.

The holding portion 313 of the joint holder is formed in a conic shape so as to correspond to the inclined surface of the opening hole 220. The largest diameter portion 314, which is formed at one end of the support protrusion 311, is formed so as to be larger than the introduction end 221 of the opening hole 220 in order to prevent separation from the opening hole 220. As the holding portion 313 moves within the opening hole in the axial direction, the tightening surface of the holding portion increases or decreases in diameter, thereby accomplishing tight holding of the electric cable.

In order to increase the force of holding the outer circumferential surface of the electric cable 10, the tightening surface 312 of the joint holder is provided with an uneven portion 315.

For example, the uneven portion 315 is formed in the shape of gear teeth formed with a constant pitch or is formed to include mountain portions and valley portions formed alternately with each other, to thereby hold the electric cable more tightly.

In addition, each of the split bodies of the joint holder, which has a semi-circular shape in cross section, has slits formed therein in the longitudinal direction thereof in order to exhibit increased elastic force when holding or releasing the electric cable.

The coupling portion 130 of the metal fitting body and the assembly portion 210 of the metal fitting cap are formed so as to be engaged with or disengaged from each other in a thread-engagement manner.

That is, the coupling portion and the assembly portion have a male/female threaded coupling structure. Thus, for example, when the joint holder or the elastic spring of the biter is damaged, it is possible to conveniently and rapidly replace the damaged part.

In addition, a lock-release bushing 400 is provided on the outer end of the holding portion 313 of the joint holder.

The lock-release bushing 400 includes a push plate 410 formed at one side thereof, a withdrawal portion 420 formed at the opposite side thereof, and a through-hole 430 formed through the push plate and the withdrawal portion. When the copper wire of the electric cable 10, from which the sheath has been stripped, is inserted into the through-hole 430 in the lock-release bushing, the copper wire is guided and introduced into the space defined by the tightening surface 312.

The outer diameter of the portion of the withdrawal portion 420 that is in contact with the holding portion 313 is set to be smaller than the diameter of the opening hole 220. Thus, as the elastic spring 320 is compressed and expanded, the withdrawal portion 420 is capable of moving into and out of the opening hole 220.

Figure 11:
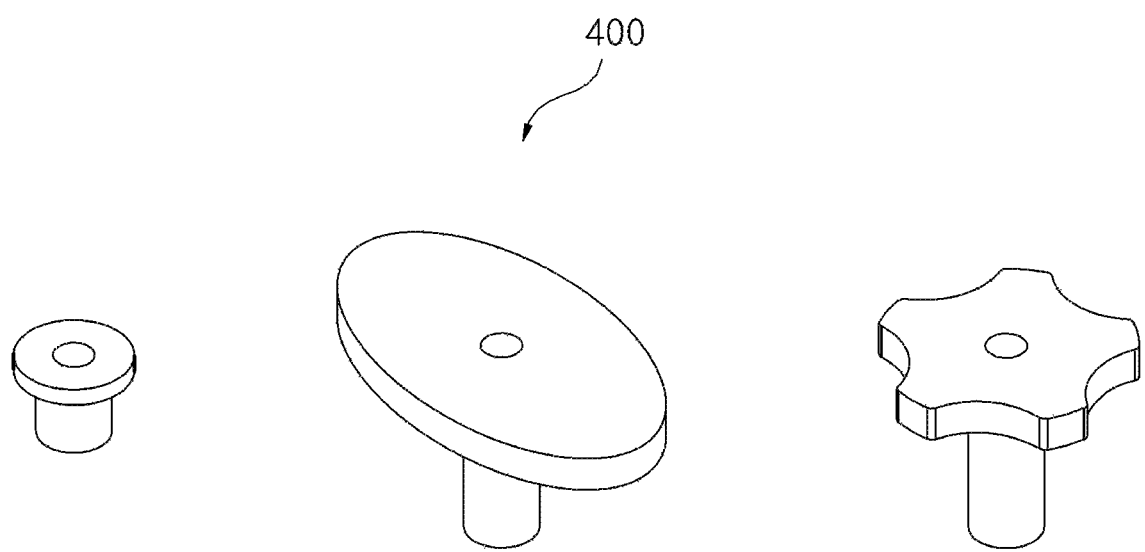
FIG. 11 is a view illustrating various exemplary shapes of a lock-release bushing according to the present invention.
Figure 12:
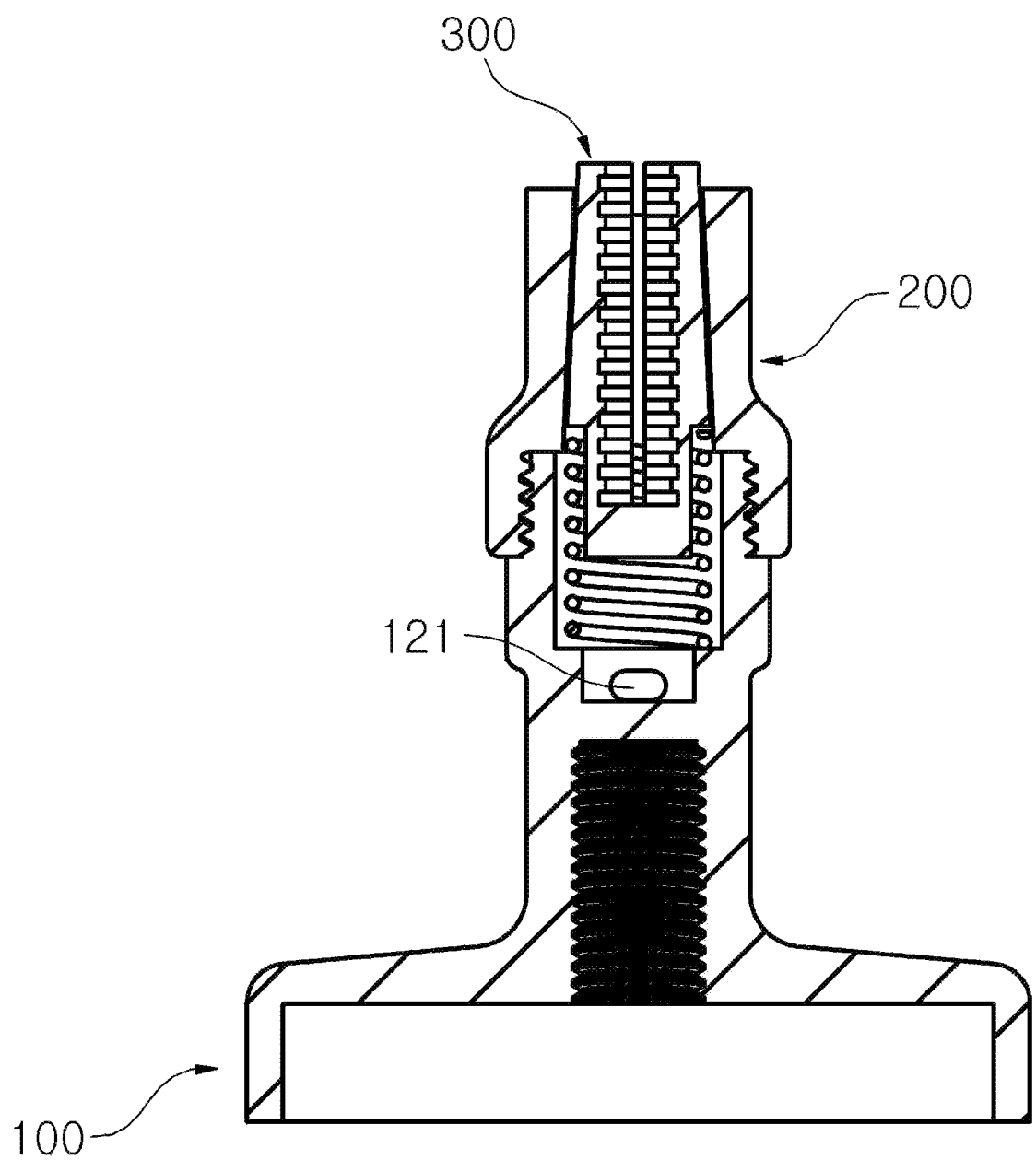
FIG. 12 is a view illustrating another embodiment of the present invention.
Figure 13:
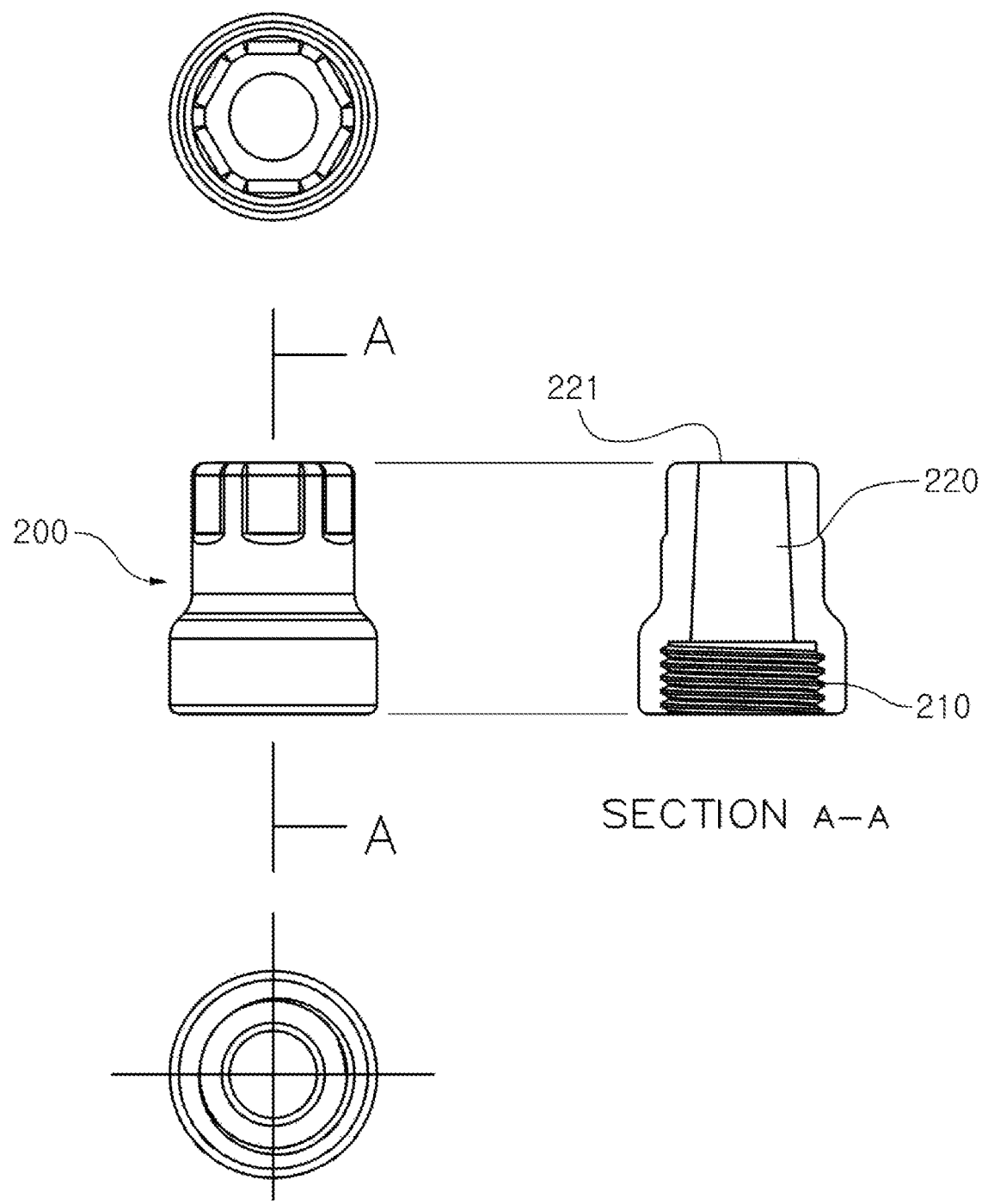
FIG. 13 is a view illustrating a metal fitting cap of the one-touch terminal according to the present invention.
Figure 14:
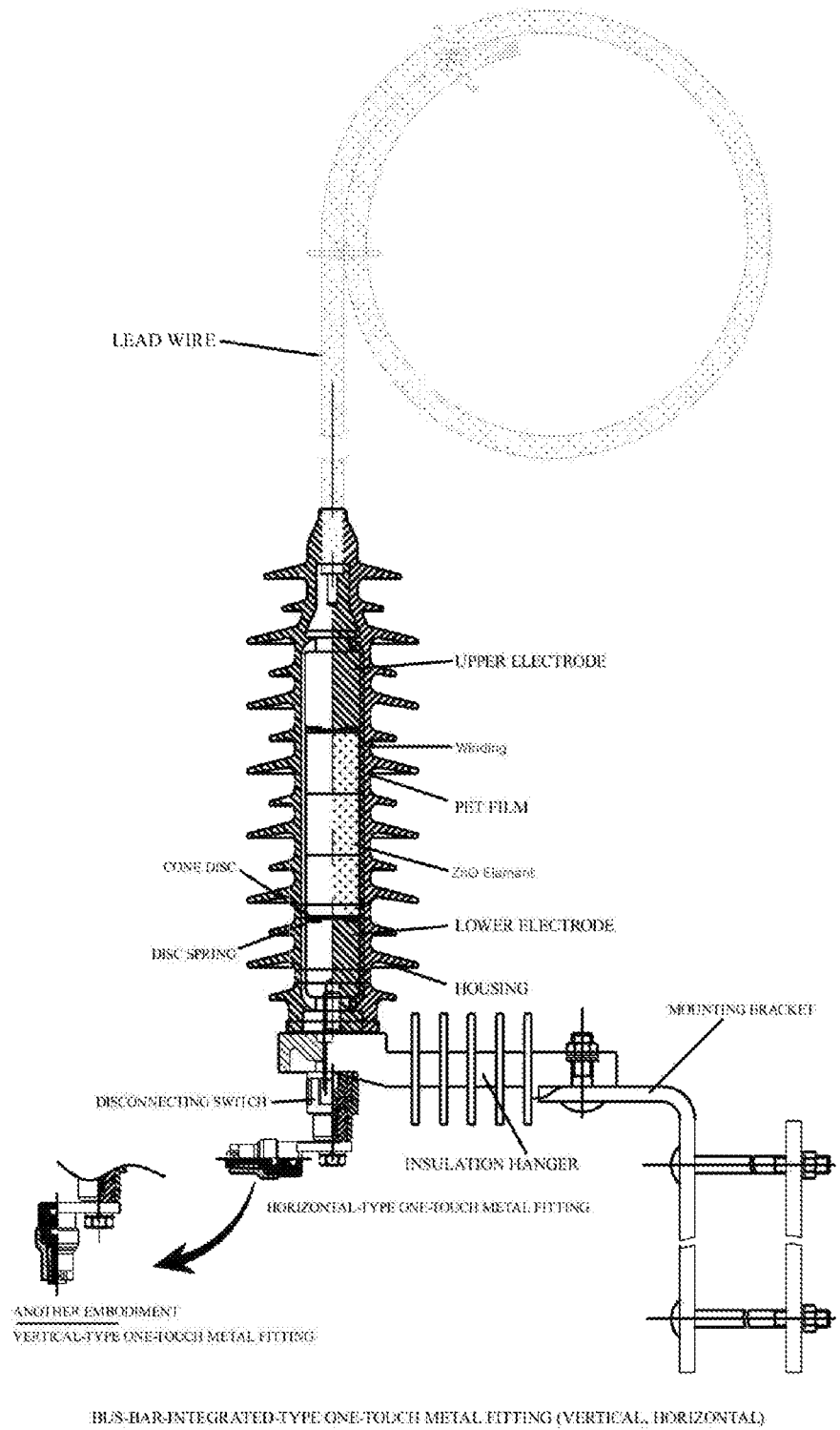
FIG. 14 is a view illustrating an example in which the one-touch terminal according to the present invention is applied to a lead-wire-mounted-type lightning arrester.

This configuration is for enabling easy connection and removal of the electric cable. The lock-release bushing, as shown in FIG. 11, may be formed so as to have a T-shaped cross section. As needed, the push plate may be formed such that a portion thereof protrudes outwards so as to serve as an L-shaped knob.

As is apparent from the above description, the present invention provides a one-touch terminal for electric connection of an electric cable to industrial electrical equipment including a lightning arrester, which includes a metal fitting cap and a biter capable of fastening and electrically connecting any of various electric cables (5 m PDC, etc.) including a lead wire to an upper-electrode-integrated-type coupling socket or to a coupling portion of an upper-electrode-separated-type metal fitting body of a lightning arrester in a one-touch manner, and more particularly, in which a metal fitting cap, in which a wedge-type biter having an elastic-pressing-type biting/releasing structure is mounted, is detachably mounted to a metal fitting body (or a coupling socket), thereby rapidly and precisely performing electric connection (fastening) of an electric cable (5 m PDC, etc.) to any of various connection metal fittings (a bushing terminal, a terminal clamp, a bus-bar-type terminal board, etc.).

In addition, the present invention enables connection of an electric cable, from which the sheath has been stripped, merely through an insertion (pushing) operation, and also enables removal of the electric cable merely through a re-pushing operation, thereby enabling even an unskilled worker to rapidly and conveniently work without specialized tools and consequently greatly improving convenience of use, working efficiency and productivity.

In addition, according to the present invention, since a metal fitting body and a metal fitting cap are formed so as to be rapidly engaged with or disengaged from each other in a thread-engagement manner, it is possible to conveniently replace a joint holder or an elastic spring of a biter.

In addition, since the tightening surface of the joint holder according to the present invention is provided with an uneven portion, which is formed in the shape of gear teeth, it is possible to hold an electric cable more tightly.

In addition, the present invention further includes a lock-release bushing, thereby enabling rapid and convenient connection (insertion) and disconnection (removal) of an electric cable.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A one-touch terminal for electric connection of an electric cable to industrial electrical equipment including a lightning arrestor, the one-touch terminal comprising:
   a metal fitting cap comprising an assembly portion formed at one side thereof so as to be detachably coupled to an upper-electrode-integrated-type coupling socket or to a coupling portion of an upper-electrode-separated-type metal fitting body of the lightning arrestor, and an opening hole formed therein so as to communicate with an accommodation recess, the opening hole having an inclined surface formed such that a diameter thereof gradually decreases toward an inlet port of the metal fitting cap, through which the electric cable is introduced; and
   a biter comprising a joint holder formed so as to be accommodated in the accommodation recess and the opening hole, the joint holder being formed to have a wedge-type hollow pipe configuration, being split into bodies in an axial direction, and being provided at one side thereof with a support protrusion, wherein a coil-type elastic spring is disposed around the support protrusion, the support protrusion and the elastic spring being accommodated in the accommodation recess, and provided at an opposite side thereof with a holding portion having a tightening surface, wherein, when the joint holder is inserted into the opening hole, a portion of an outer end of the holding portion is exposed outside the opening hole,
   wherein the metal fitting body is provided at one side thereof with a fastening portion formed so as to be assembled and coupled to a connection metal fitting of any one of the lightning arrester, a cutout switch, an insulator for a pole transformer and industrial electrical equipment, and is provided at a side thereof opposite the fastening portion with a coupling portion having therein the accommodation recess in order to accommodate a portion of the electric cable, from which a sheath has been stripped, therein,
   wherein the fastening portion of the metal fitting body is any one of a vertical-type one-touch terminal and a horizontal-type one-touch terminal,
   wherein the connection metal fitting is any one of a bushing terminal, a terminal clamp and a bus-bar-type terminal board, and
   wherein the insulator is any one of a primary high-pressure bushing and a secondary low-pressure bushing.

2. The one-touch terminal according to claim 1, wherein the holding portion of the joint holder is formed in a conic shape so as to correspond to the inclined surface of the opening hole, and wherein the joint holder is further provided with a largest-diameter portion formed at one end of the support protrusion so as to be larger than an introduction end of the opening hole.

3. The one-touch terminal according to claim 1, wherein the tightening surface of the joint holder is provided with an uneven portion formed with a constant pitch in order to increase a force of holding an outer circumferential surface of the electric cable.

4. The one-touch terminal according to claim 1, wherein the coupling portion of the metal fitting body and the assembly portion of the metal fitting cap are formed so as to be engaged with or disengaged from each other in a thread-engagement manner.

5. The one-touch terminal according to claim 1, wherein the metal fitting body is provided with a drain hole for water discharge extending from an outer circumferential surface of the accommodation recess so that an interior of the accommodation recess communicates with an outside.

6. A one-touch terminal for electric connection of an electric cable to industrial electrical equipment including a lightning arrestor, the one-touch terminal comprising:

a metal fitting cap comprising an assembly portion formed at one side thereof so as to be detachably coupled to an upper-electrode-integrated-type coupling socket or to a coupling portion of an upper-electrode-separated-type metal fitting body of the lightning arrestor, and an opening hole formed therein so as to communicate with an accommodation recess, the opening hole having an inclined surface formed such that a diameter thereof gradually decreases toward an inlet port of the metal fitting cap, through which the electric cable is introduced;

a biter comprising a joint holder formed so as to be accommodated in the accommodation recess and the opening hole, the joint holder being formed to have a wedge-type hollow pipe configuration, being split into bodies in an axial direction, and being provided at one side thereof with a support protrusion, wherein a coil-type elastic spring is disposed around the support protrusion, the support protrusion and the elastic spring being accommodated in the accommodation recess, and provided at an opposite side thereof with a holding portion having a tightening surface, wherein, when the joint holder is inserted into the opening hole, a portion of an outer end of the holding portion is exposed outside the opening hole; and a lock-release bushing provided on an outer end of the holding portion of the joint holder, the lock-release bushing comprising a push plate formed at one side thereof, a withdrawal portion formed at an opposite side thereof, and a through-hole formed through the push plate and the withdrawal portion, wherein when a copper wire of the electric cable, from which a sheath has been stripped, is inserted into the through-hole, the copper wire is guided and introduced into a space defined by the tightening surface, and wherein a portion of the withdrawal portion that is in contact with the holding portion has an outer diameter smaller than a diameter of the opening hole so that the withdrawal portion moves into and out of the opening hole as the elastic spring is compressed and expanded.

* * * * *